(12) United States Patent
Lee et al.

(10) Patent No.: US 7,945,609 B2
(45) Date of Patent: May 17, 2011

(54) METHOD FOR COMPOSING LOOKUP TABLE AND SEARCHING INDEX THEREOF

(75) Inventors: Eung-Don Lee, Daejon (KR); O-Hyung Kwon, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1265 days.

(21) Appl. No.: 11/541,213

(22) Filed: Sep. 29, 2006

(65) Prior Publication Data

US 2007/0124354 A1 May 31, 2007

(30) Foreign Application Priority Data

Nov. 25, 2005 (KR) .................. 10-2005-0113550

(51) Int. Cl.
   *G06F 1/02* (2006.01)
(52) U.S. Cl. .................................. 708/276
(58) Field of Classification Search ............ None
    See application file for complete search history.

(56) References Cited

U.S. PATENT DOCUMENTS

| | | | |
|---|---|---|---|
| 4,169,246 A * | 9/1979 | Schriber et al. | 375/326 |
| 5,467,294 A * | 11/1995 | Hu et al. | 708/276 |
| 6,937,671 B2 | 8/2005 | Samarasooriya | |
| 2002/0065861 A1 * | 5/2002 | Kim et al. | 708/270 |

* cited by examiner

*Primary Examiner* — David H Malzahn
(74) *Attorney, Agent, or Firm* — Blakely, Sokoloff, Taylor & Zafman

(57) ABSTRACT

A method for composing a lookup table and searching indexes thereof is provided. The method includes the steps of: a) composing a lookup table using a symmetry of a sine and a cosine function; b) changing and setting a gain of a DCO by reflecting a lookup table size in the DCO; c) transforming an absolute value of a DCO output to an integer value; d) determining a range of the integer value of the DCO output; e) searching indexes of a sine and an cosine function according to the range of the integer value of the DCO output; and f) correcting a sign of a lookup table value corresponding to the searched index of the sine function and a sign of a lookup table value corresponding to the searched index of the cosine function according to the range of integers of the DCO output.

8 Claims, 4 Drawing Sheets

FIG. 3

| INDEX | sine(θ) |
|---|---|
| 0 | 0.00000000 |
| 1 | 0.00613588 |
| 2 | 0.01227154 |
| 3 | 0.01840673 |
| 4 | 0.02454123 |
| ... | ... |
| 252 | 0.99969882 |
| 253 | 0.99983058 |
| 254 | 0.99992470 |
| 255 | 0.99998118 |
| 256 | 1.00000000 |

METHOD FOR COMPOSING LOOKUP TABLE AND SEARCHING INDEX THEREOF

FIELD OF THE INVENTION

The present invention relates to a method for composing a lookup table and searching indexes thereof for a carrier wave restoring module in a modulator/demodulator; and, more particularly, to a method for composing a lookup table to occupy a minimum memory using the symmetry of a sine and a cosine function and for quickly searching the indexes of the lookup table using the output value of a digital controlled oscillator (DCO) by changing the range of output values from the DCO through reflecting the size of the lookup table to the gain of the DCO.

DESCRIPTION OF RELATED ARTS

Generally, a digital carrier wave restoring module corrects the phase error of a carrier wave between a transmitter and a receiver using a digital controlled oscillator (DCO) by compensating the phase of an input signal according to the phase error which is an output value outputted from the DCO. In order to correct the phase error according to the output value of the DCO, sine function values and cosine function values are stored in the lookup table (LUT), the indexes of the sine function and the cosine function are searched based on the output value of the DCO, and a sine value and a cosine value stored according to each index are used.

In the simplest method for composing a lookup table according to the related art, a phase range from $-2\pi$ to $2\pi$ is divided into N phase values wherein N is a predetermined integer number, and sine values and cosine values corresponding to divided phase values are sequentially stored into a lookup table in the order of indexes.

Such a conventional method requires the large quantity of memory because a sine lookup table and a cosine lookup table must be provided independently although a sin value and a cosine value can be quickly calculated by rapidly searching the indexes from the phase value.

Meanwhile, a method and system for restoring a carrier wave was introduced in U.S. Pat. No. 6,937,671 issued to 'Spacebridge semiconductor corporation' at Aug. 30, 2005. However, the U.S. Pat. No. 6,937,671 fails to teach a method for composing a lookup table and searching indexes thereof although a lookup table was described therein.

SUMMARY OF THE INVENTION

It is, therefore, an object of the present invention to provide a method for composing a lookup table occupying a minimum memory using the symmetry of a sine and a cosine function and for quickly searching the indexes of the lookup table using the output value of a digital controlled oscillator (DCO) as the indexes of the lookup table by reflecting the size of the lookup table to the gain of the DCO.

It is another object of the present invention to provide a method for composing a lookup table and searching an index thereof for minimizing a memory usage by composing a lookup table using the symmetry of a sine function and a cosine function in order to search the index of the lookup table.

In accordance with an aspect of the present invention, there is provided a method of composing a lookup table and searching indexes of the lookup table including the steps of: a) composing a lookup table using a symmetry of a sine function and a cosine function; b) changing and setting a gain of a digital controlled oscillator (DCO) by reflecting a size of the lookup table in the DCO; c) transforming an absolute value of a DCO output to an integer value; d) determining a range of the integer value of the DCO output; e) searching an index of a sine function and an index of an cosine function according to the range of the integer value of the DCO output; and f) correcting a sign of a lookup table value corresponding to the searched index of the sine function and a sign of a lookup table value corresponding to the searched index of the cosine function according to the range of integers of the DCO output.

In accordance with an aspect of the present invention, there is also provided a method of composing a lookup table and searching an index thereof including the steps of: a) composing a lookup able using a symmetry of a sine function and a cosine function; b)checking a gain of a digital controlled oscillator (DCO) that is already set; c) determining a range of a phase value of DCO output; d) obtaining a phase value of a sine function and a phase value of a cosine function according to a range of the phase value of the DCO output; e) searching an index of a sine function and an index of a cosine function by dividing the obtained phase value of the sine function and the obtained phase value of the cosine function by a phase increment of a unit index of the lookup table; f) transforming the index of the sine function and the index of the cosine function into integer values; and g) correcting signs of lookup table values corresponding to the searched index of the sine function and the searched index of the cosine function according to the range of the phase value of the DCO output.

BRIEF DESCRIPTION OF THE DRAWINGS

The above and other objects and features of the present invention will become better understood with regard to the following description of the preferred embodiments given in conjunction with the accompanying drawings, in which:

FIG. 3 shows a lookup table having a size of 257 (N=256) in accordance with a preferred embodiment of the present invention;

DETAILED DESCRIPTION OF THE INVENTION

Hereinafter, a method of composing a lookup table and searching indexes thereof in accordance with a preferred embodiment of the present invention will be described in more detail with reference to the accompanying drawings.

Figure 1:
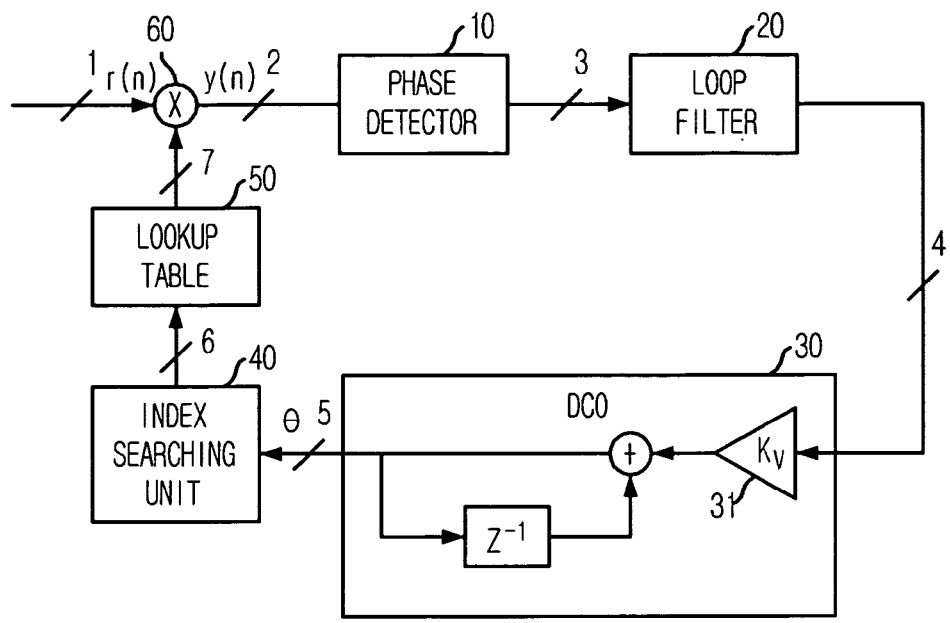
FIG. 1 is a block diagram illustrating a carrier wave restoring module in a typical quadrate amplitude modulation (QAM) modulator/demodulator.

FIG. 1 is a block diagram illustrating a carrier wave restoring module in a typical quadrate amplitude modulation (QAM) modulator/demodulator.

As shown in FIG. 1, the carrier wave restoring module of the QAM modulator/demodulator according to the related art includes a phase detector 10 for detecting a phase, a loop filter 20, a digital controlled oscillator (DCO) 30, an index searching unit 40 for searching the indexes of a lookup table, a lookup table 50 for storing sine function values and cosine function values according to the indexes of a sine function and the indexes of a cosine function, and a phase inverse converter 60 for inversely converting a phase. Since the carrier wave restoring module of the typical QAM modulator/demodulator have been widely known, the detail description thereof is omitted.

In the carrier wave restoring module, the phase error of a carrier wave between a transmitter and a receiver is corrected by compensating the phase of an input signal according to the phase error $r(n)=r_{Re}(n)+jr_{Im}(n)$ of the digital controlled oscillator (DCO) as like as Eq. 1.

$$y_{Re}(n)=+r_{Re}(n)\cos(\theta)+r_{Im}(n)\sin(\theta)$$

$$y_{Im}(n)=-r_{Re}(n)\sin(\theta)+r_{Im}(n)\cos(\theta) \qquad \text{Eq. 1}$$

The phase error of the carrier wave can be corrected using a sine value and a cosine value which are found from the lookup table by searching the indexes of sine function and cosine function in the lookup table according to the output values of the DCO after storing sine function values and cosine function values in the lookup table.

Figure 2:
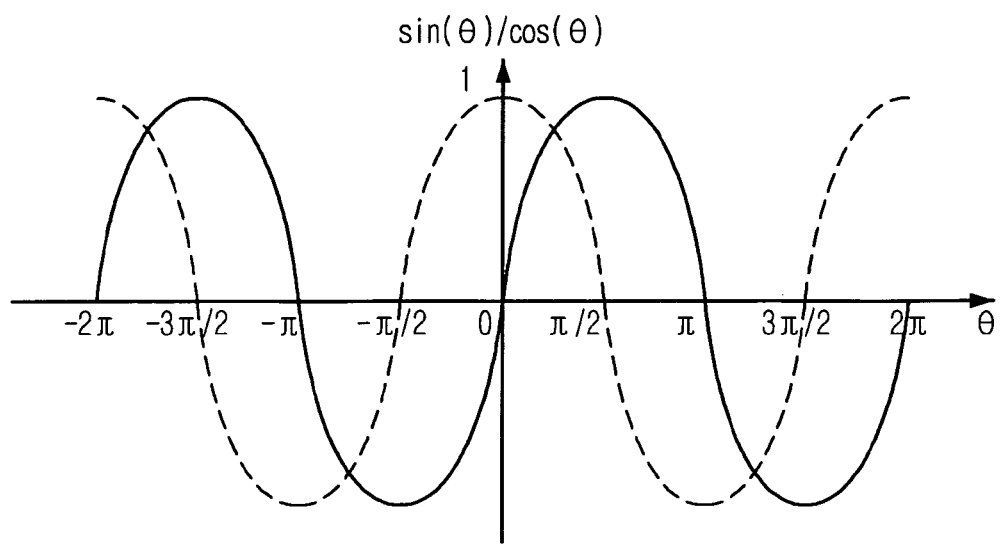
FIG. 2 is a graph showing sine values and cosine values according to phase values.

FIG. 2 is a graph showing sine values and cosine values according to phase values. In FIG. 2, the sine values are expressed as a solid line and the cosine value are expressed as a dotted line.

In order to minimize a memory usage in the present invention, a phase range of 0 to $\pi/2$ is divided into N phase values and a lookup table is composed by storing corresponding sine values at the divided phase values in the order of the indexes. For example, if a phase range of 0 to $\pi/2$ is divided into 256 phase values (N=256), the indexes of the lookup table and the sine values according to the indexes are shown in FIG. 3.

FIG. 3 shows a lookup table having a size of 257 (N=256) in accordance with a preferred embodiment of the present invention.

As shown in FIG. 2, using the symmetry of the sine function and the cosine function, sine values and cosine values in a range of $-2\pi$ to $2\pi$ can be calculated from a lookup table having sine values in the range of 0 to $\pi/2$.

Figure 4:
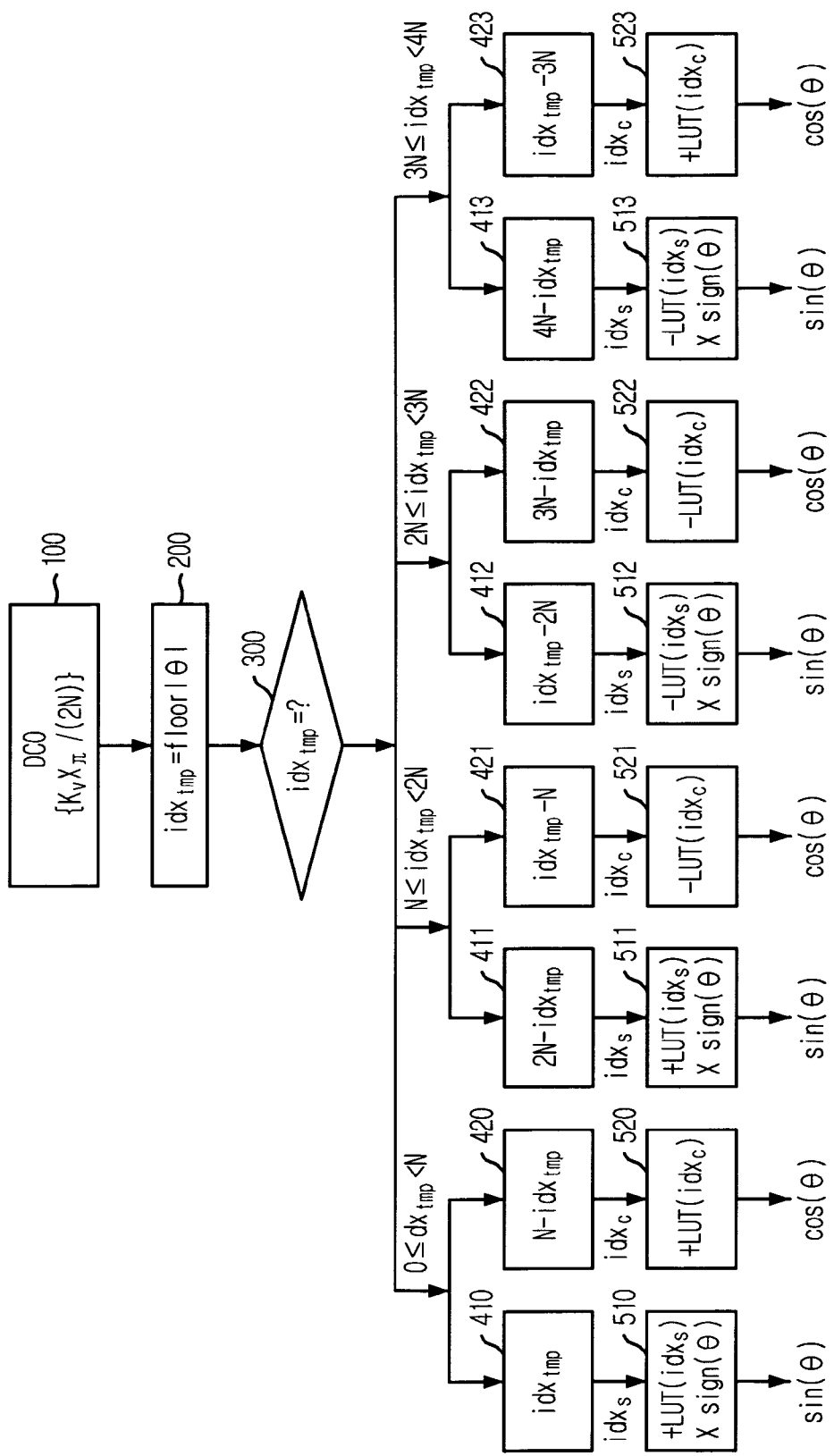
FIG. 4 is a flowchart of a method of searching indexes of a lookup table when a gain of a DCO is previously set according to the size of a lookup table in accordance with a preferred embodiment of the present invention.

FIG. 4 is a flowchart of a method of searching indexes of a lookup table when a gain of a DCO is previously set according to the size of a lookup table in accordance with a preferred embodiment of the present invention.

At first, a gain of a DCO is changed and set by reflecting the size of the lookup table in the DCO at step S100.

Then, the absolute value of the DCO output is transformed to an integer value at step S200.

Then, the range of the integer value of the DCO output is determined at step S300.

Then, the indexes of the sine function and the cosine function are searched according to the determined range of the integer value of the DCO output at steps S410, S420, S412, S422, S413 and S423.

Then, the signs of the lookup table values corresponding to the indexes of the cosine function and the sings of the lookup table values corresponding to the indexes of the sine function are corrected according to the range of the integer values of the DCO output.

Hereinafter, each of the steps for searching the indexes of the lookup table will be described in more detail.

At first, in the step 100 for changing and setting the gain of the DCO by reflecting the size of the lookup table into the DCO, the gain of the DCO is changed and set to make the DCO output value itself to be the unit index of the lookup table. For example, as described above, the lookup table is composed by dividing the phase range of 0 to $\pi/2$ into N phase values and storing sine values corresponding to the divided phase values in the order of the indexes. In this case, the size of the lookup table is N+1, and the phase increases by $\pi/(2N)$ when the index increases by one. Generally, the DCO output value is a phase value in the range of $-2\pi$ to $2\pi$. If the gain $(K_v)$ of the DCO is divided by the phase increment $(\pi/(2N))$ of a unit index as like as Eq. 2, the output of the DCO becomes a value in the range of $-4N$ to $4N$.

$$K'_v = K_v \frac{2N}{\pi} \qquad \text{Eq. 2}$$

Since $2N/\pi$ is multiplied to $K_v$ in Eq. 2, it seems like that a mutiplier may be required. However, it is possible not to use the multiplier by storing $K'_v$ instead of storing because $K'_v$ is constant.

In the step S200 for transforming the absolute value of the DCO output to the integer value, the DCO output values are transformed to the integer numbers $(idX_{tmp})$ in the range of 0 to 4N by removing the numbers below a decimal point after transforming the range of the DCO output value from the range of $-4N$ to $4N$ to the range of 0 to 4N.

In the step S300 for determining the range of the integer values of the DCO output values, it determines whether the integer value of the DCO output is in a which range among the ranges of 0 to N, N to 2N, 2N to 3N or 3N to 4N. The range of the real phase values according to the range of the integer value of the DCO output is shown in table 1.

TABLE 1

| Integer value $(idX_{tmp})$ of DCO output | Real phase value |
|---|---|
| 0 to N | 0 to $+\pi/2$ or $-\pi/2$ to 0 |
| N to 2N | $+\pi/2$ to $+\pi$ or $-\pi$ to $-\pi/2$ |
| 2N to 3N | $+\pi$ to $+3\pi/2$ or $-3\pi/2$ to $-\pi$ |
| 3N to 4N | $+3\pi/2$ to $+2\pi$ or $-2\pi$ to $-3\pi/2$ |

In the steps S410, S420, S411, S421, S412, S422, S413 and S424 for searching the indexes of the sine function and the cosine function according to the range of the integer value of the DCO output, the index of the sine function and the index of the cosine function are searched from the lookup table according to the range of the integer value of the DCO output. As described above, the lookup table is composed of the sine functions in the phase rang of 0 to $\pi/2$. Therefore, the indexes $idx_s$ of the sine function can be searched by the absolute function of the sine function in the phase range 0 to $2\pi$ according to the range of the integer values $(idx_{tmp})$ of the DCO output as like as Eq. 3. Also, the indexes $idx_c$ of the cosine function can be searched by whether the absolute function of the cosine function is vertically symmetric from the sine function in the phase range of 0 to $\pi/2$ according to the range of the integer values $(idx_{tmp})$ of the DCO output as like as Eq. 3.

$$\begin{cases} idx_s = idx_{tmp} \\ idx_c = N - idx_{tmp} \end{cases}, 0 \le idx_{tmp} < N \qquad \text{Eq. 3}$$

$$\begin{cases} idx_s = 2N - idx_{tmp} \\ idx_c = idx_{tmp} - N \end{cases}, N \le idx_{tmp} < 2N$$

$$\begin{cases} idx_s = idx_{tmp} - 2N \\ idx_c = 3N - idx_{tmp} \end{cases}, 2N \le idx_{tmp} < 3N$$

$$\begin{cases} idx_s = 4N - idx_{tmp} \\ idx_c = idx_{tmp} - 3N \end{cases}, 3N \le idx_{tmp} < 4N$$

In the steps S510, S520, S511, S521, S512, S522, S513 and S523 for compensating the sign of the lookup table value of the index of the cosine function and the sign of the lookup table value of the index of the sine function according to the range of the integer value of the DCO output, the signs of the sine value and the cosine value searched from the lookup table are compensated according to the range of the integer values of the DCO output. Since the lookup table is composed of sine functions in the phase range of 0 to $\pi/2$, the signs of the sine function and the cosine function in the phase range of 0 to $\pi/2$ must be changed according to the range of the integer value of the DCO output by whether it is horizontally symmetric from the sine function in the range of 0 to $\pi/2$ as shown in Table 2.

TABLE 2

| Integer value ($idx_{tmp}$) of DCO output | Function | Whether code is modified or not |
|---|---|---|
| 0 to N | Sine | X |
|  | Cosine | X |
| N to 2N | Sine | X |
|  | Cosine | ○ |
| 2N to 3N | Sine | ○ |
|  | Cosine | ○ |
| 3N to 4N | Sine | ○ |
|  | cosine | X |

Since the cosine function is symmetric from the x axis as an even function for the phase range of $-2\pi$ to 0, the sign of the cosine function is maintained without regarding to the sign of the DCO output value. Also, since the sine function is symmetric at origin as the odd function, the sign of the sine function must be changed according to the sign of the DCO output value. Therefore, the final sine value and cosine value can be calculated according to the range of the integer values ($idx_{tmp}$) of the DCO output by the DCO output value ($\theta$), the index ($idx_s$) of the sine function and the index ($idx_c$) of the cosine function as like as Eq. 4.

$$\begin{cases} \sin(\theta) = +LUT(idx_s) \times \text{sign}(\theta) \\ \cos(\theta) = +LUT(idx_c) \end{cases}, 0 \le idx_{tmp} < N \quad \text{Eq. 4}$$

$$\begin{cases} \sin(\theta) = +LUT(idx_s) \times \text{sign}(\theta) \\ \cos(\theta) = -LUT(idx_c) \end{cases}, N \le idx_{tmp} < 2N$$

$$\begin{cases} \sin(\theta) = -LUT(idx_s) \times \text{sign}(\theta) \\ \cos(\theta) = -LUT(idx_c) \end{cases}, 2N \le idx_{tmp} < 3N$$

$$\begin{cases} \sin(\theta) = -LUT(idx_s) \times \text{sign}(\theta) \\ \cos(\theta) = +LUT(idx_c) \end{cases}, 3N \le idx_{tmp} < 4N$$

Figure 5:
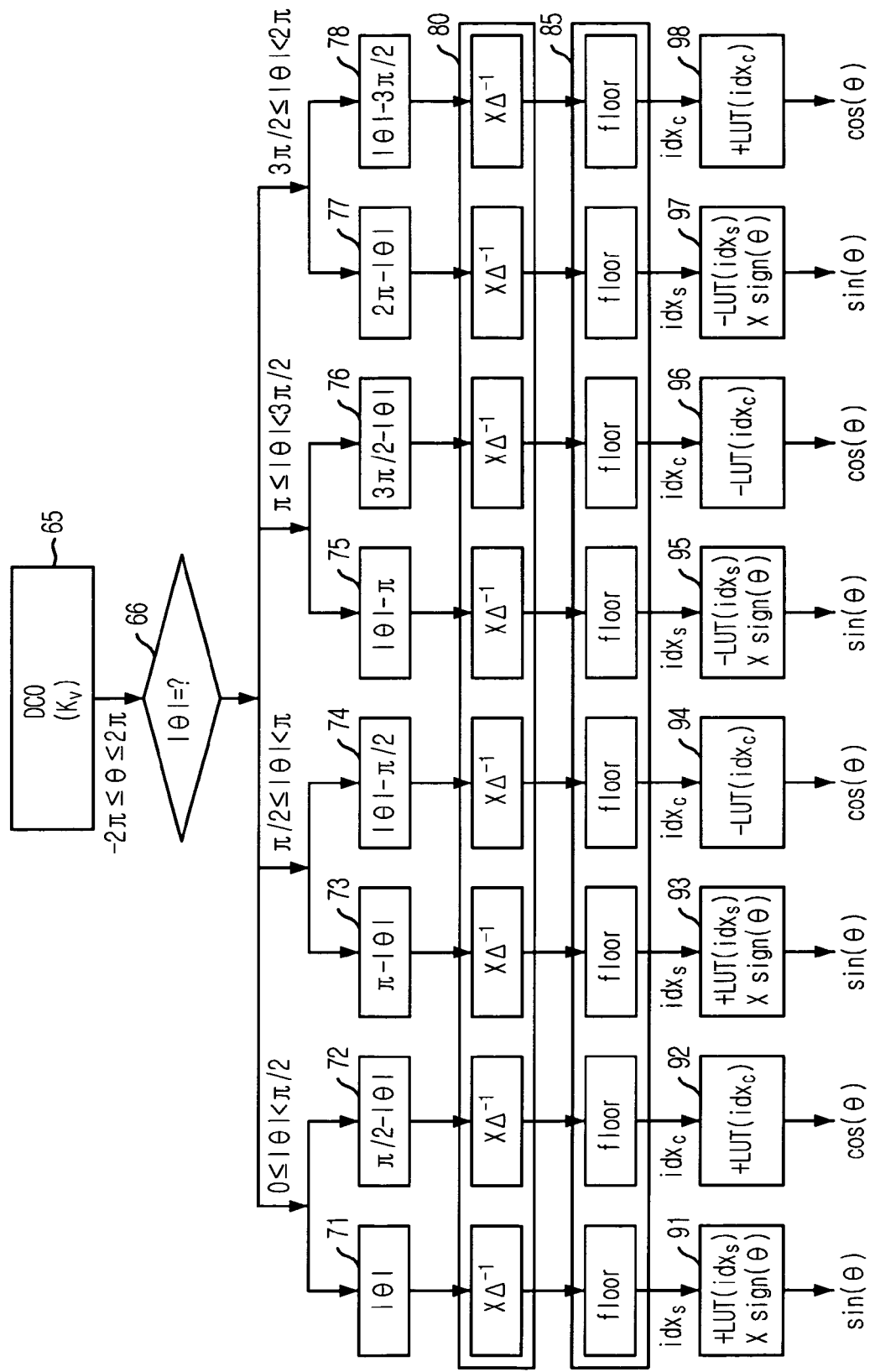
FIG. 5 is a flowchart showing a method of searching the indexes of a lookup table when the gain of a DCO is not changed in accordance with another embodiment of the present invention.

In the present invention, the index of the lookup table can be quickly searched based on the DCO output value without using a supplementary circuit such as a multiplier which will be required by another embodiment of the present invention with reference to FIG. 5 by previously changing and setting the gain of the DCO by reflecting the size of the lookup table in the DCO. Therefore, it is possible to design a carrier wave restoring module that does not degrade the phase correct capability.

FIG. 5 is a flowchart showing a method of searching the indexes of a lookup table when the gain of a DCO is not changed in accordance with another embodiment of the present invention. Since the method of FIG. 5 is similar to the method of FIG. 4, the essential points of the method of FIG. 5 will be described.

At first, the gain of the DCO was already set at step S65.

Then, the range of phase values of the DCO output is determined at step S66.

Then, the phase values of the sine function in the range of 0 to $\pi/2$ and the phase values of the cosine function in the range of 0 to $\pi/2$ are calculated according to the range of the phase value of the DCO output at steps S71, S72, S73, S74, S75, S76, S77 and S78.

Then, the index of the sine function and the index of the cosine function are searched by dividing the calculated phase values of the sine function and the cosine function by the phase increment ($\pi/(2N)=\Delta$) of the unit index of the lookup table at step S80.

Then, the searched indexes of the sine function and the cosine function are converted to the integer value at step S85.

Then, the sign of the lookup table value corresponding to the index of the sine function and the sign of the lookup table value corresponding to the index of the cosine function are corrected according to the range of the phase value of the DCO output at steps S91, S92, S93, S94, S95, S96, S97 and S98.

Since the gain of the DCO is used without reflecting the size of the lookup table as described above, an inverse number of the phase increment ($\Delta=\pi/(2N)$) of the unit index must be multiplied to the DCO output value in order to obtain the index of the lookup table from the DCO output value as shown in FIG. 5. Therefore, one more multiplier is required compared to the method shown in FIG. 4. However, the memory usage can be dramatically reduced compared to the conventional technology.

The method of composing the lookup table and searching the index thereof according to the present invention can be identically applied to various types of modulator/demodulator having a QAM based carrier wave restoring module and similar equipments.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

According to the present invention, the indexes of the lookup table can be quickly searched by composing the lookup table to occupy a minimum memory using the symmetry of the sine function and the cosine function and by making the DCO output value to be an index of the lookup table through reflecting the size of the lookup table to the gain of the DCO.

According to the present invention, it is possible to design a carrier wave restoring module not to degrade a phase correct capability.

According to the present invention, the amount of using the memory can be minimized by composing the lookup table using the symmetry of the sine function and the cosine function.

The present application contains subject matter related to Korean patent application No. KR 2005-0113550, filed in the Korean patent office on Nov. 25, 2005, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A method of composing a lookup table and searching indexes of the lookup table comprising the steps of:
   a) composing a lookup table of size N, where N is an integer using a subset of the range $2\pi$ to $2\pi$ using a sine function and a cosine function;
   b) setting a gain of a digital controlled oscillator (DCO) by using a value obtained from the lookup table;
   c) transforming an absolute value of the gain set in step b) to an integer value;
   d) determining a range of the integer value as one of 0 to N, N to 2N, 2N to 3N and 3N to 4N;
   e) searching an index of a sine function and an index of a cosine function according to the determined range of the integer value; and
   f) correcting a sign of a lookup table value corresponding to the searched index of the sine function and a sign of a lookup table value corresponding to the searched index of the cosine function according to the determined range of the integer value.

2. The method as recited in claim 1, wherein in step a), the lookup table is composed by dividing a phase range of 0 to $\pi/2$ into N phase values where N is an integer number and storing the sine values of the divided phase values in an order of indexes in order to reduce a memory usage.

3. The method as recited in claim 2, wherein in step d), the determined range $K'_v$ of the DCO output is changed into the range of −4N to 4N through dividing the gain $K_v$ of the DCO by a phase increment ($\pi/(2N)$) of a unit index according to the equation:

$$K'_v = K_v \frac{2N}{\pi}.$$

4. The method as recited in claim 1, wherein in step e), the index ($idx_s$) of the sine function and the index ($idx_c$) of the cosine function are calculated according to the range of integer values ($idx_{tmp}$) of the DCO output according to the equation:

$$\begin{cases} idx_s = idx_{tmp} \\ idx_c = N - idx_{tmp} \end{cases}, 0 \leq idx_{tmp} < N$$

$$\begin{cases} idx_s = 2N - idx_{tmp} \\ idx_c = idx_{tmp} - N \end{cases}, N \leq idx_{tmp} < 2N$$

$$\begin{cases} idx_s = idx_{tmp} - 2N \\ idx_c = 3N - idx_{tmp} \end{cases}, 2N \leq idx_{tmp} < 3N$$

-continued $$\begin{cases} idx_s = 4N - idx_{tmp} \\ idx_c = idx_{tmp} - 3N \end{cases}, 3N \leq idx_{tmp} < 4N.$$

5. The method as recited in claim 3, wherein in step f), signs of the final sine value and the final cosine value are corrected according to the range of the integer value of the DCO output by the DCO output value $\theta$, the index (idx) of the searched sine function or the index ($idx_s$) of the searched cosine function according to the equation:

$$\begin{cases} \sin(\theta) = +LUT(idx_s) \times \text{sign}(\theta) \\ \cos(\theta) = +LUT(idx_c) \end{cases}, 0 \leq idx_{tmp} < N$$

$$\begin{cases} \sin(\theta) = +LUT(idx_s) \times \text{sign}(\theta) \\ \cos(\theta) = -LUT(idx_c) \end{cases}, N \leq idx_{tmp} < 2N$$

$$\begin{cases} \sin(\theta) = -LUT(idx_s) \times \text{sign}(\theta) \\ \cos(\theta) = -LUT(idx_c) \end{cases}, 2N \leq idx_{tmp} < 3N$$

$$\begin{cases} \sin(\theta) = -LUT(idx_s) \times \text{sign}(\theta) \\ \cos(\theta) = +LUT(idx_c) \end{cases}, 3N \leq idx_{tmp} < 4N.$$

6. A method of composing a lookup table and searching an index thereof comprising the steps of:
   a) composing a lookup of size N, where N is an integer using a subset of the range −2π to 2π of a sine function and a cosine function;
   b) checking a gain of a digital controlled oscillator (DCO) that is already set;
   c) determining a range of a phase value of an output of the DCO;
   d) obtaining a phase value of a sine function and a phase value of a cosine function according to a range of the phase value of the DCO output;
   e) searching an index of a sine function and an index of a cosine function by dividing the obtained phase value of the sine function and the obtained phase value of the cosine function by a phase increment of a unit index of the lookup table;
   f) transforming the index of the sine function and the index of the cosine function into integer values; and)
   g) correcting signs of lookup table values corresponding to the searched index of the sine function and the searched index of the cosine function according to the range of the phase value of the DCO output.

7. The method as recited in claim 6, wherein in step a), the lookup table is composed by dividing a phase range of 0 to π/22 into N phase values and storing the sine values of the divided phase values in an order of indexes in order to reduce a memory usage.

8. The method as recited in claim 6, wherein in step d), the phase value of the sine value in the range of 0 to π/2 and the phase value of the cosine function in the range of 0 to π/2 are calculated according to the range of the phase value of the DCO output.

\* \* \* \* \*